Oct. 21, 1952 J. N. GREGORY 2,614,710
APPARATUS FOR UNLOADING EQUIPMENT
Filed Aug. 23, 1948 5 Sheets-Sheet 1

Inventor:
James N. Gregory
By
His Attorney

Oct. 21, 1952   J. N. GREGORY   2,614,710
APPARATUS FOR UNLOADING EQUIPMENT
Filed Aug. 23, 1948   5 Sheets-Sheet 2

Inventor:
James N. Gregory
By
His Attorney

Oct. 21, 1952     J. N. GREGORY     2,614,710
APPARATUS FOR UNLOADING EQUIPMENT

Filed Aug. 23, 1948     5 Sheets-Sheet 3

Inventor:
James N. Gregory
By
His Attorney

Oct. 21, 1952     J. N. GREGORY     2,614,710
APPARATUS FOR UNLOADING EQUIPMENT

Filed Aug. 23, 1948     5 Sheets-Sheet 4

Inventor:
James N. Gregory
By
His Attorney

Patented Oct. 21, 1952

2,614,710

UNITED STATES PATENT OFFICE 2,614,710

APPARATUS FOR UNLOADING EQUIPMENT

James N. Gregory, La Habra, Calif., assignor to Shell Development Company, San Francisco, Calif., a corporation of Delaware Application August 23, 1948, Serial No. 45,616

2 Claims. (Cl. 214—38)

This invention relates to apparatus for loading and unloading materials and equipment to or from a truck or trailer at a selected location and pertains particularly to apparatus for unloading elongated equipment members such as drill pipe, tubing, casing, etc., said apparatus forming a suitable storage base or platform for said equipment after its removal from the truck or trailer.

When a truckload of material is unloaded at a well site, it is generally necessary to construct or in some way provide a base or platform means onto which the material may be loaded. Unloading platforms which are normally available at docks, warehouses, industrial plants, and the like, are not usually found at the more isolated spots, such as the locations where well drilling operations are in progress. A load of heavy and bulky equipment necessitates the use of hoisting means such as block and tackle, a portable crane, etc. If the load comprises a number of items, such, for example, as drill pipe, tubing or casing, unloading may involve manual operations, which are costly, time-consuming, and sometimes hazardous.

It is an object of the present invention to provide apparatus for loading and unloading heavy and bulky equipment as a single unit to or from a truck or trailer without use of special hoisting equipment.

It is a further object of the present invention to provide an apparatus for unloading equipment from a truck, said apparatus being adapted to become a platform, rack or base for the unloaded equipment.

A still further object of the present invention is to provide a combination loading, unloading and platform means of simple, rugged and inexpensive design whereby the hazards normally accompanying loading operations are eliminated.

Other objects and advantages of the present invention will become apparent from the following description taken with reference to the drawing wherein.

Figure 1:
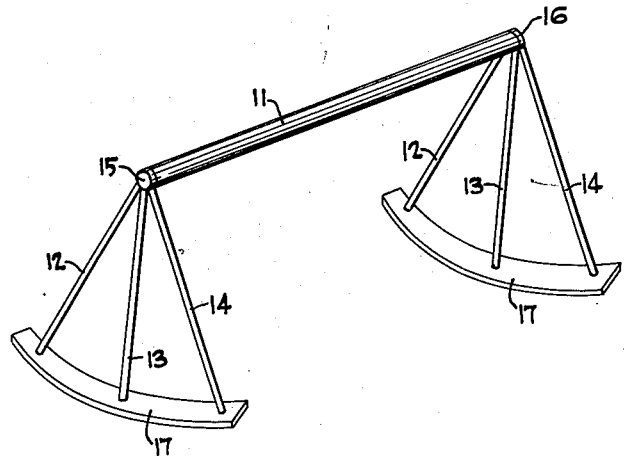
Figure 1 is an isometric view of one embodiment of the unloading and rack means of the present invention.

In its simplest form, the unloading and racking means of the present invention may comprise a pair of support means one of which is shown in Figure 1. Each support means comprises a horizontal bar 11 having supporting leg means secured at either end. The supporting leg means may comprise several legs 12, 13 and 14 having increasing lengths, so that leg 14 is longer than leg 13, which is in turn longer than leg 12. The supporting leg means thus form a cam or cam means and will be referred to as such for the purposes of this application. The ends of the horizontal bar 11 form the hubs 15 and 16 to which the upper ends of the legs are secured in any suitable manner rotatably, or fixedly as by welding. The legs 12, 13 and 14 attached to the hubs 15 and 16, are angularly displaced from each other and lie in substantially the same plane which is normal to the horizontal bar 11.

The lower ends of the legs 12, 13 and 14 are fixedly secured in any suitable manner, as by welding, to a base bar or plate 17 which is preferably arcuate in shape. Since this plate 17 serves as the load-bearing plate between the legs and the ground, it is preferably wide enough to prevent being forced into the ground by the weight of a load. If substantial loads are to be placed on the support means, they are preferably fabricated from suitable metallic structural forms such as tubes, I-beams, and the like.

Figure 2:
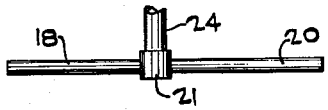
Figures 2 and 3 are top and side views, respectively, of a modified form of the unloading means.
Figures 3, 8:
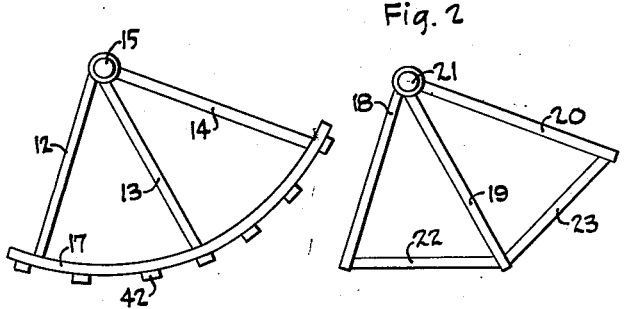
Figures 8, 13 and 14 are side views of other embodiments of a cam means employed in the present invention.

If desired, the cam means at either end of the horizontal bar 11 may be removably affixed thereto. A removable type cam means is illustrated in Figures 2 and 3. In this embodiment the legs 18, 19 and 20 are secured to a hub 21 and the other ends of the legs are connected by base plates 22 and 23, which may be straight as shown or rounded as the member 17 of Figure 1. Means for connecting this leg means to the horizontal bar (designated by numeral 11 in Figure 1) are affixed to or carried by the hub 21. In this embodiment the connecting means comprises a post or pin 24 adapted to be pivotally inserted in one end of a tubular bar 11. While the cam means have been described as comprising a hub, legs and a base plate, it is realized that the cam means may be formed of a single piece of sheet of steel plate cut to a suitable sector shape such as that of the area defined in Figure 1 by elements 12, 14 and 17. The cam means may, therefore, be defined for purposes of this invention as having the general shape of an irregular sector having its center at the hub, the peripheral elements of said sector being either circular, as elements 17 in Figure 1, or polygonal as in Figures 2 and 10, the radial distance between the center and one particular point on the periphery (e. g. 18 in Figure 3) being shorter than the radial distance between said centers and another point on the periphery (e. g. 20 in Figure 3).

While the legs 13 and 14 of the embodiment of Figure 1 are each longer than the adjacent or preceding legs 12 and 13, it is seen in the embodiment of Figure 3 that any two adjacent legs 19 and 20 may be of equal length, while the third leg 18 may be shorter than the other two. Thus, with the cam means positioned on its short leg 18 and adjacent long leg 19, the hub, and any horizontal bar or platform means connected thereto, is at a lower level than when the cam means is positioned on its two long legs 19 and 20. The intermediate leg 19 cooperates with the short leg 18 when the cam means is in one position and with the other long leg 20 in the latter position. For the purposes of this invention, the cam and support means will be said to be at their "low level" when the short leg or its adjacent base plate is in direct contact with the ground, and will be considered at their "high level" when the longer legs or the base plate therebetween is in contact with the ground. It is further obvious that in the embodiment of Figure 3 all three legs may be of equal length provided the annular displacement between them is different.

Figure 9:
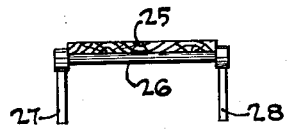
Figures 9 and 10 are diagrammatic front and side views of a platform means constructed according to the present invention.
Figure 10:
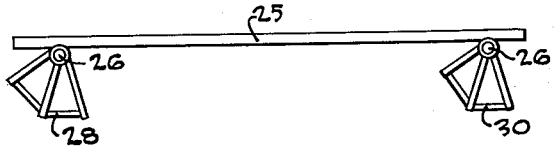

The load supporting means shown in Figures 9 and 10 comprise a platform 25 having a pair of tubular braces 26 secured in any suitable manner to the platform and extending the width thereof. The open ends of the braces 26 serve as bearings for the posts 24 (Figure 2) on the cam means 27, 28, etc. Thus, platform 25 is either raised or lowered as either the outer long or short legs of the cam means contact the ground.

Figure 4:
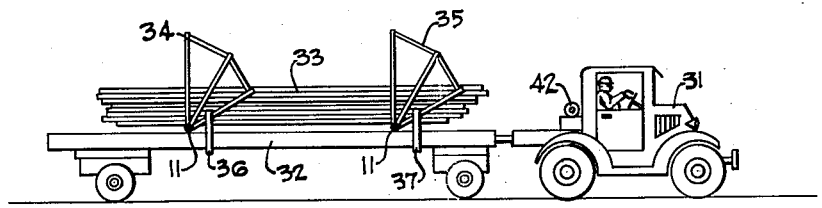
Figures 4, 5, 6 and 7 are diagrammatic views illustrating consecutive steps in the method of employing the apparatus of the present invention.

Unloading operations according to the present invention are illustrated in Figures 4, 5, 6 and 7. A tractor 31 is shown in Figure 4 drawing a trailer 32 loaded with pipe 33. The trailer also carries a pair of three-legged support means similar to those shown in Figure 1 or 3. The horizontal bar means 11 (Figure 1) of the support means are positioned across the bed of the trailer serving as a base for the load of pipe 33. The cam means 34 and 35 of said support means are raised in a traveling position and secured to the trailer by any suitable type of clamp means 36 and 37 thus preventing the cam means from hitting the ground while traveling and serving at the same time to confine the pipe load on the trailer.

Figure 5:
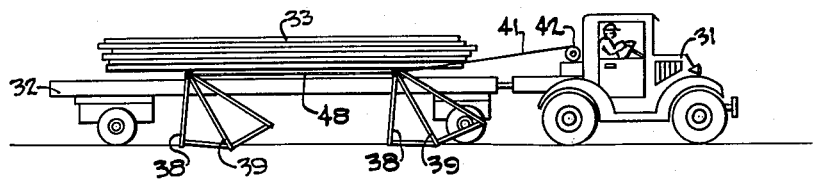

In Figure 5 the trailer has been positioned over the spot where the load of pipe is to be stored or unloaded. The clamps 36 and 37 are removed, allowing the cam means 34 and 35 to swing down so that the short leg 38 and the middle leg 39 of the cam means contact the ground. The load of pipe is then removed from the bed of the trailer 32 by causing the cam means 34 and 35 to tip forward so that the middle leg 39 and long leg 40 touch the ground. For example, this may be accomplished by running a line 41 from a winch 42, on the back of the tractor 31, to the hubs of the cam means 34 and 35. As it is generally not desired to tilt the load by raising cam means 34 and 35 one after the other, they may be brought to a raised position simultaneously by connecting them by link means 48, such as braces, cables, etc., whereby the pull of the winch 42 is transmitted to both leg means at the same time. The load itself may serve as a connection between the support means so as to cause them to act simultaneously. The trailer 32 is then withdrawn from beneath the load of pipe, which is left positioned on the support means. While the unloading operation has been described when a pair of support means are used, it is evident that loading or unloading operations may be carried on when more than two support means are utilized.

Figure 6:
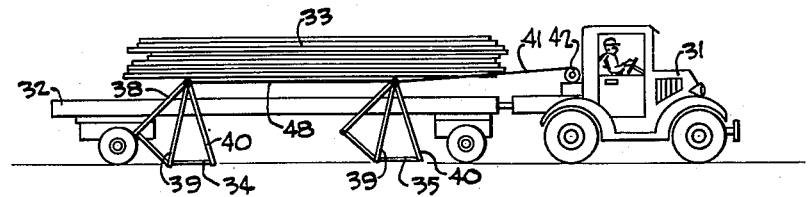
Figure 7:
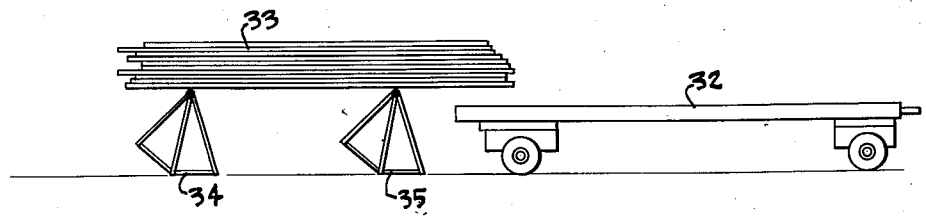

Trucks and trailers may obviously be loaded by substantially reversing the above-described series of operations. Thus, a load of pipe, mounted on support means whose long and middle legs contact the ground (as shown in Figure 7) may be loaded on a trailer by first backing the trailer 32 under the load (as shown in Figure 6). The support means are then tipped backwards by a winch and pulley or other suitable means, so that the short and middle legs 38 and 39 of the cam means contact the ground causing the load to be lowered onto the bed of the trailer. The cam means may then be clamped into traveling position, as shown in Figure 4. Where removable leg means are used, they may be removed from the platform means and stored on the trailer in any suitable place.

Figure 11:
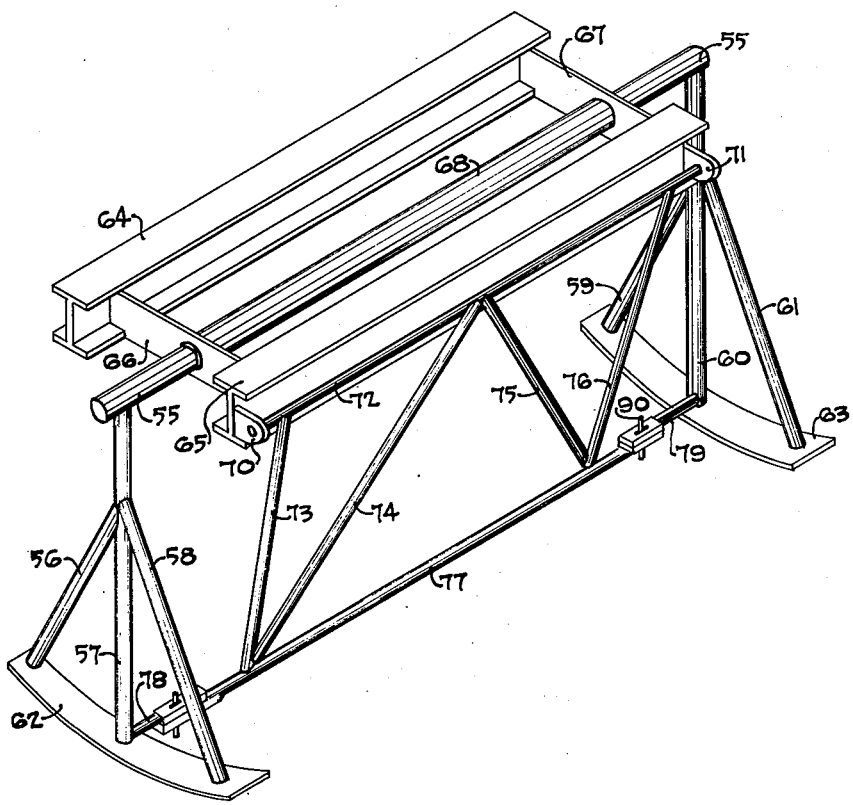
Figures 11 and 12 are isometric views of a preferred embodiment of the present invention.
Figure 12:
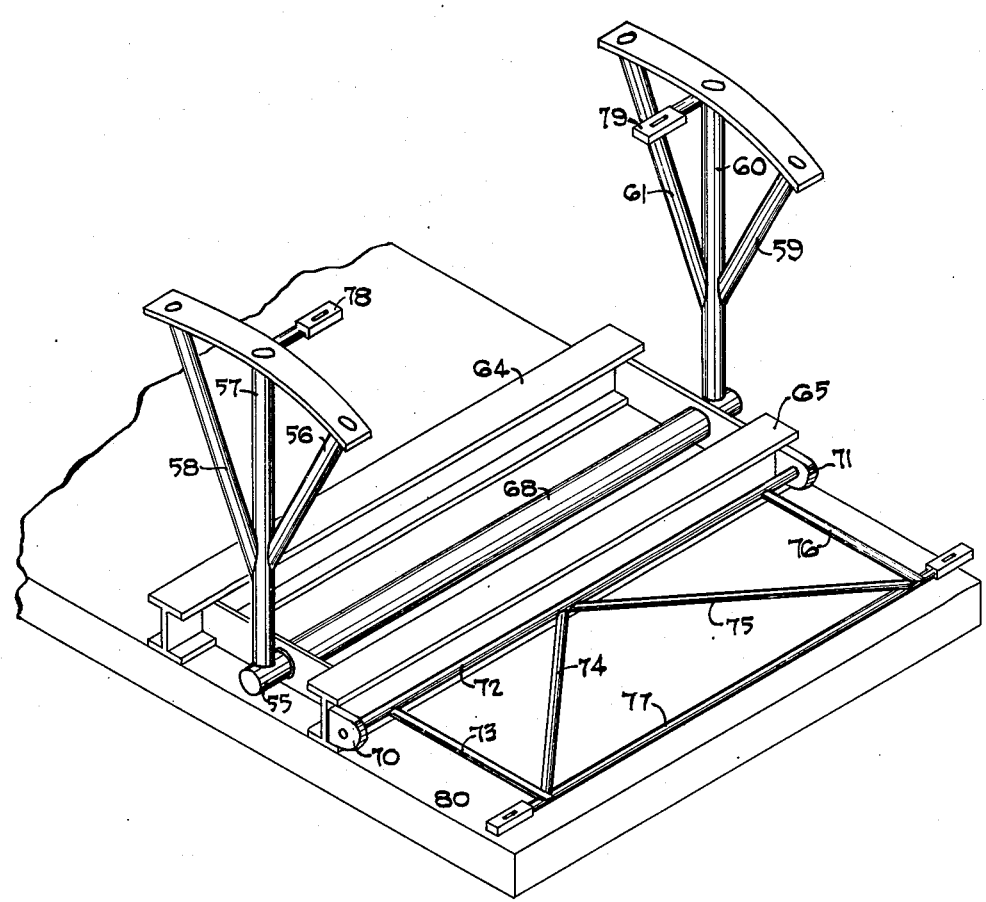

In the above-described method for loading or unloading trucks or trailers, the horizontal bar means (represented by numeral 11 in Figure 1) between the load and the bed of the truck necessarily has to roll beneath the load when the cam means 34 and 35 (Figure 4), which are fixedly secured to the bar means, are lowered from their traveling position to their operating position in contact with the ground (Figure 5). Another embodiment of the support means of the present invention is shown in Figure 11 wherein the horizontal bar means 55 may be a single bar element or one formed of several sections having fixedly secured to the ends thereof, as by welding, two cam means having legs 56, 57, 58 and 59, 60, 61, respectively, said legs being connected by arcuate plates 62 and 63. Pivotally mounted on the bar means 55 is a load-bearing platform means comprising longitudinal I-beams 64 and 65 of a height greater than the diameter of the bar 55 and transverse beams or cross supports 66 and 67, there being formed in or secured to said cross beams 66 and 67 in any suitable manner, as by welding, suitable bearing means for the bar means 55 such as a tubular element 68. Thus, the cam means attached to either end of the bar means 55 may be rotated therewith from a traveling position to an operating position without the load rolling on the bar means 55. Also, when the bar means 55 is divided in two sections of a length less than one-half of the width of a truck, which sections have cam means attached thereto, both sections may be forced into the bearing means after they have been rotated into the traveling position thus reducing the width of the unloading device while traveling, as shown in Figure 12.

Since the cam means may be subjected to horizontal forces that are substantially parallel to the horizontal bar means, the cam means may be, if desired, braced against such forces in any suitable manner. As it is necessary that a truck be able to pass under the support means in its raised position, it is essential that any bracing means used between the cam means be detachably secured thereto. One form of a detachable bracing means is shown in Figures 11 and 12 comprising bearings 70 and 71 secured, as by welding, to the longitudinal beam 65 of the load platform, a bar member 72 pivotally mounted in said bearings 70 and 71 and bracing members 73, 74, 75, 76 and 77 secured, as by welding, to said bar member 72 and adapted to be pivoted therewith. The ends of the lower bracing member 77 are detachably secured by any suitable locking means 90 to post means 78 and 79, affixed to the cam means. Thus, when a load is being transferred to a truck, as shown in Figure 12, the bracing means pivots upward to a horizontal position and rests on the truck bed 80.

If support means similar to the one illustrated in Figure 1 are used, it will be seen that the support means and the load carried thereby will rock upward or downward on the arcuate base plates 17. Hence, in unloading operations, it is necessary to place suitable blocking means (not shown) under these base plates after the cam means have been rocked forward lifting the load off the trailer, thus preventing the cam means from rocking back on their short legs.

Figure 13:
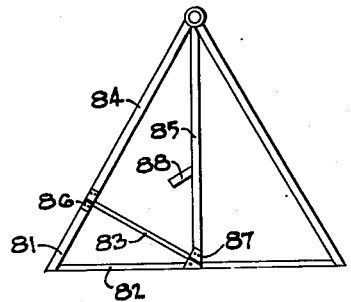
Figure 14:
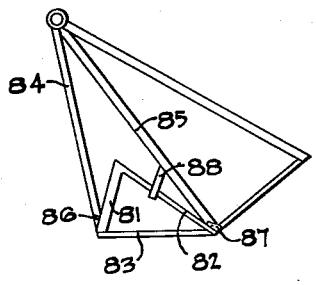

The blocking means may take the form of a hinged section at the bottom of the cam means, as diagrammatically shown in Figures 13 and 14, which is adapted to swing down when the cam means is in its elevated position and to form a portion of the supporting base of the cam means whereby said cam means are converted to substantially regular triangular-shaped support means. In Figures 13 and 14 the hinged blocking means comprises bar members 81, 82 and 83 which are secured together, as by welding, and affixed to legs 84 and 85 of the cam means by hinges 86 and 87. Any suitable spring or clamp means 88 may be used to keep the cam means in its retracted or inoperative position when it is not being used. It is obvious that substantially the same method of loading or unloading equipment is applicable when using the platform embodiment of the present invention shown in Figure 10.

It has also been found that some loads may be removed from a trailer by the simple operation of setting the arcuate base plates 17 (Figure 1) on the ground and having the tractor 31 pull the trailer 32 forward. As the trailer moves forward the base plates 17 rock forward onto the longer legs causing the hubs 15, horizontal bars 11 and any load supported thereon to be raised from the bed of the trailer. While employing this mode of operation it may be desirable to have anti-slip or gripping elements or shoes 42 formed in or affixed to the arcuate base plates 17, as shown in Figure 8, thus supplying the necessary friction between said plates and the ground to prevent the plates from skidding along the ground as the trailer is pulled forward by the tractor.

It is evident from its use that the length of the horizontal bar 11 and the distance between the cam means attached thereto must be slightly greater than the width of the truck or trailer so that the trailer may be withdrawn after the load has been raised therefrom. In the above definition the length of a leg is considered to be the length of the leg plus any base plate and/or shoe attached thereto.

In the appended claims, the term "truck" is used to designate any truck, trailer or other vehicle or carrier adapted to transport loads.

I claim as my invention:

1. In apparatus for removing a load from the bed of a movable truck, load-bearing support means comprising at least two independent frameworks spaced from each other by a predetermined desired distance, each of said frameworks having transverse and longitudinal structural members adapted to be positioned in a substantially horizontal plane on the bed of the truck between the bed and the load, the transverse members of each support means being substantially normal to the axis of motion of the truck and of a length substantially equal to the width of said truck, the longitudinal members being secured to said transverse members near the ends thereof, bearing means carried by each of said longitudinal members, a bar member rotatably mounted in said bearing means, the length of said bar member being in excess of the width of the truck and the body, cam means carried by said bar member at each end thereof, each of said cam means having the general shape of an irregular sector affixed at its center to said bar member for rotation in a vertical plane normal thereto, the radial distance from said center to at least one point on the periphery of said sector being shorter than said distance to another point of said periphery, said shorter radial distance being substantially equal to the distance from said support means to the ground on which the truck stands, horizontal bracing means detachably secured between said two cam means, said bracing means comprising bearing means affixed to one of the transverse members of said framework, a rod pivotally mounted in said bearing means, a bracing framework secured to said rod and pivotable therewith, said bracing framework being adapted to engage said cam means at substantially ground level when the load is supported on the cam means, and locking means respectively carried by said bracing and said cam means for detachably affixing said means to each other.

2. In apparatus for removing a load from the bed of a movable truck, load-bearing support means comprising at least two frameworks, each of said frameworks having longitudinal transverse structural members adapted to be positioned in a substantially horizontal plane on the bed of the truck between said bed and said load, the transverse members of each support means being substantially normal to the axis of motion of the truck and of a length substantially equal to the width of said truck, said longitudinal members being secured to said transverse members near the ends thereof, tubular bearing means fixedly secured to said longitudinal members between said transverse members, a bar member rotatably and slidably positioned in each end of said bearing means, said bar members being adapted to slide in said bearing so that one end extends over the edge of the truck bed, cam means carried by said extended ends of said bar means, each of said cam means having the general shape of an irregular sector affixed at its center to said bar member for rotation in a vertical plane normal thereto, the radial distance from said center to at least one point on the periphery of said sector being shorter than said distance to another point of said periphery, said shorter radial distance being substantially equal to the distance from said support means to the ground on which the truck stands, whereby, when said cam means are swung downwards to contact the ground at those points of their peripheries spaced from their centers by the shortest radial distances, a substantially horizontal pull applied to said support means in the direction of the axis of motion of said truck causes said support means to rock on said cam means until said cam means contact the ground at those points of their peripheries spaced from their centers by radial distances greater than said shortest radial distances, whereby said support means and said load are elevated with regard to said truck bed to permit the truck to be removed from thereunder, and horizontal bracing means detachably secured between said cam means, said bracing means comprising bearing means affixed to one of said transverse members of said framework, a rod pivotally mounted in said bearing means, a bracing framework secured to said rod and pivotable therewith, said bracing framework being adapted to engage said cam means at substantially ground level when the load is supported on the cam means, and locking means respectively carried by said bracing and said cam means for detachably affixing said means to each other.

JAMES N. GREGORY.

REFERENCES CITED

The following references are of record in the file of this patent:

UNITED STATES PATENTS

| Number | Name | Date |
|---|---|---|
| 1,049,210 | Cole | Dec. 31, 1912 |
| 2,172,244 | Grundler | Sept. 5, 1939 |